United States Patent [19]

Okano

[11] Patent Number: 4,768,601
[45] Date of Patent: Sep. 6, 1988

[54] UNEVEN GROUND VEHICLES

[75] Inventor: Katumi Okano, Edosaki, Japan

[73] Assignee: Kabushiki Kaisha Okano Kosan, Edosaki, Japan

[21] Appl. No.: 68,236

[22] Filed: Jun. 30, 1987

[30] Foreign Application Priority Data

| Jul. 1, 1986 | [JP] | Japan | 61-154574 |
| Aug. 22, 1986 | [JP] | Japan | 61-195273 |
| Nov. 7, 1986 | [JP] | Japan | 61-263871 |
| Feb. 21, 1987 | [JP] | Japan | 62-38520 |

[51] Int. Cl.⁴ .................................................. B62D 61/10
[52] U.S. Cl. ................................... 180/24.07; 180/235
[58] Field of Search ............ 180/6.48, 9.1, 9.26, 180/14.3, 9.46, 79.5, 24.07, 235, 7.1; 280/97

[56] References Cited

U.S. PATENT DOCUMENTS

| 1,064,804 | 6/1913 | Wood | 280/97 |
| 2,393,324 | 1/1946 | Joy | 180/24.07 X |
| 2,748,879 | 6/1956 | Bailey | 180/24.07 |
| 2,878,883 | 3/1959 | France et al. | 180/9.46 |
| 3,039,828 | 6/1962 | Johnston | 180/9.26 X |
| 3,414,072 | 12/1968 | Hodges et al. | 180/235 X |
| 3,473,619 | 10/1969 | Dion | 180/235 X |
| 3,568,778 | 3/1971 | Swisher et al. | 180/235 X |
| 3,730,287 | 5/1973 | Fletcher et al. | 180/7.1 |
| 4,470,475 | 9/1984 | Carlson | 180/6.48 |

Primary Examiner—John A. Pekar
Attorney, Agent, or Firm—Ladas & Parry

[57] ABSTRACT

An uneven ground vehicle comprises a plurality of running means each having a support frame for supporting wheels, tires, crawlers or the like. Each support frame is connected to the body of the vehicle so as to be swingable in the front and rear direction of the vehicle whereby the wheels, crawlers or the like can continue to contact a ground surface even when the vehicle runs on an uneven ground.

8 Claims, 16 Drawing Sheets

UNEVEN GROUND VEHICLES

BACKGROUND OF THE INVENTION

This invention relates to an uneven ground vehicle to be used in the field of agriculture, forestry or mining, and more particularly to an uneven ground vehicle suitable for its use on a snow-covered road and a field of civil engeering works.

In the field of agriculture, forestry or mining, an uneven ground vehicle having endless belts or crawlers has been used in addition to a normal vehicle because the endless belts or the crawlers have a big area of ground contact and can produce a big tractive force.

However, in such an uneven ground vehicle having caterpillars or crawlers, a complete ground contact cannot be necessarily ensured when the vehicle runs on an uneven or a rough ground thereby to decrease its tractive force. For example, when the vehicle moves from an upgrade surface to a downgrade surface, first, the front part of the body of the vehicle is floated from the ground surface shortly before the vehicle passes by a top surface between the upgrade and downgrade surfaces and the rear part of the body thereof is then jumped up from the ground surface shortly after the vehicle passes by the top surface. Further, when the vehicle comes to a raised ground, the body of the vehicle is much inclined. In the case of floating and jumping of the body of the vehicle, area of ground contact as well as tractive force is decreased thereby to be uncomfortable to drive. In contrast, when the vehicle moves from a downgrade ground surface to an upgrade ground surface, the intermediate part of the body is floated from the ground surface in a state wherein the front and rear parts of the body contact the ground surface. Also at this time, area of ground contact becomes small and the body of the vehicle is swung much. Especially, in case that a metal endless belt or crawler is used, there are defects such as insufficient speed, generation of noise and damage of a road surface.

Moreover, a normal vehicle having a plurality of tires or wheels cannot produce a sufficient tractive force and, therefore, the use of the vehicle on an uneven or a rough ground is restricted. In addition, a big inclination of the body thereof upon passing over a raised ground is a problem.

SUMMARY OF THE INVENTION

It is an object of this invention to provide an uneven ground vehicle in which a plurality of wheels, tires or crawlers or the like can always contact a ground surface without floatation or separation of a part of the body of the vehicle from a ground surface even when the vehicle runs on an extremely uneven ground thereby to ensure a sufficient tractive force and stable running and in which an inclination angle of the body of the vehicle can be decreased as compared with a conventional vehicle when the vehicle passes over a raised or projected ground.

According to this invention, there is provided an uneven ground vehicle suitable for running on an uneven ground, which comprises: a body; and a plurality of running means each having a support frame for supporting wheels, tires crawler or the like, the running means being provided on two front and rear portions of the body in such a manner that a support frame of each running means is swingable in the front and rear direction of the vehicle.

The nature, utility, and further features of this invention will be more clearly apparent from the following detailed description with respect to preferred embodiments of the invention when read in conjunction with the accompanying drawings, briefly described below.

DETAILED DESCRIPTION OF THE INVENTION

FIGS. 1 to 5 show a first embodiment of this invention.

Figure 1:
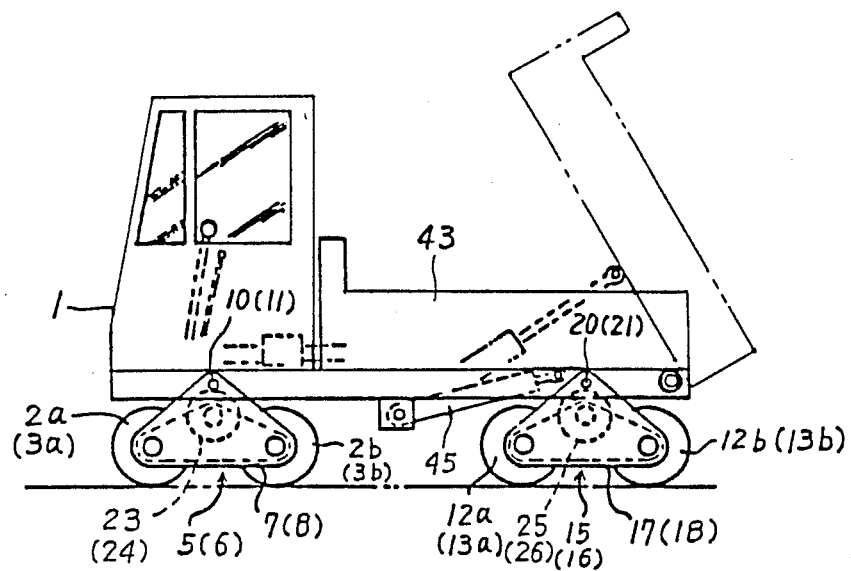
FIG. 1 is a side view of an uneven vehicle showing a first embodiment of this invention.
Figure 2:
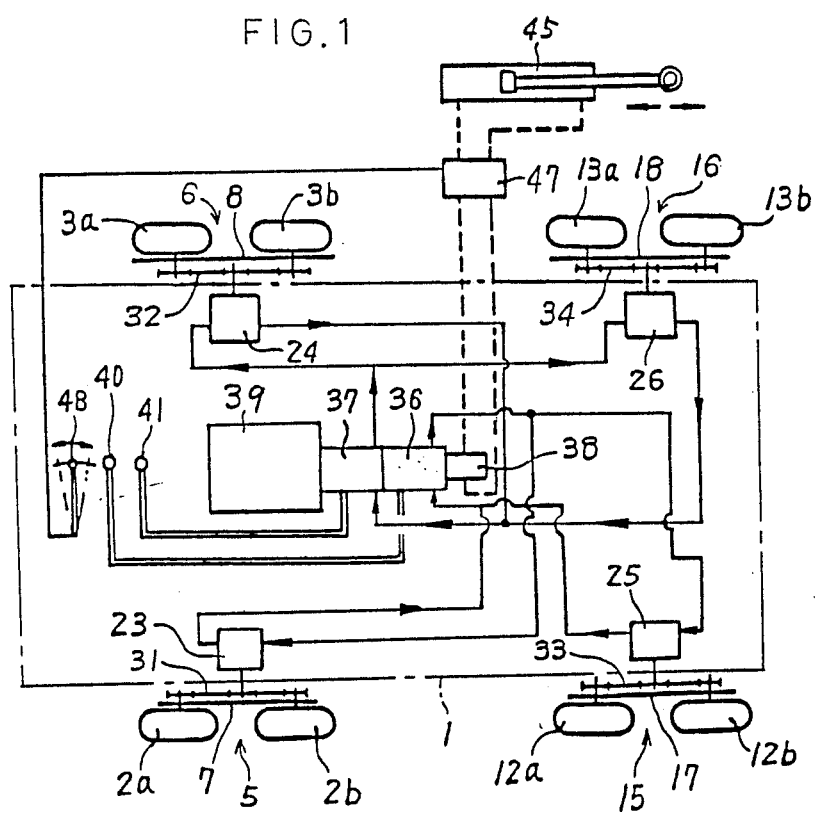
FIG. 2 is a plan view showing a driving system of the uneven vehicle.
Figure 3:
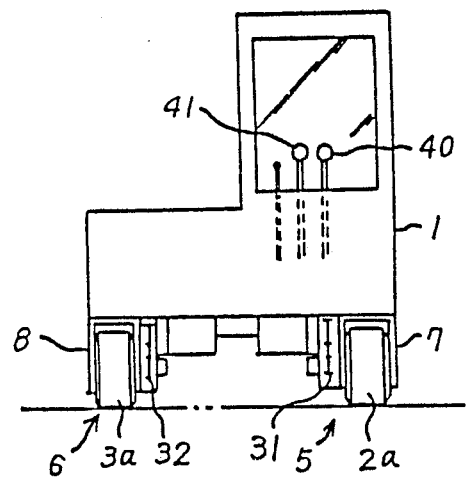
FIG. 3 is a front view of the vehicle.

In FIGS. 1 and 2, a vehicle for running on an uneven ground has a body 1, on the front part of which two front left and right running means 5, 6 are provided. The left running means 5 has two forward and backward wheels 2a, 2b and the right running means 6 has two forward and backward wheels 3a, 3b. The wheels 2a, 2b are provided separately from each other in the front and rear direction of the vehicle on a triangular support frame 7 while the wheels 3a, 3b are provided separately from each other in the front and rear direction thereof on a triangular support frame 8. The support frame 7, 8 are pivotably connected, at their respective upper portions, to the opposite sides of the body 1 through two pins 10, 11, respectively. The two pins 10, 11 are located at their intermediate positions in the front and rear direction of the vehicle on the support frames 7, 8, respectively.

Likewise, two rear left and right running means 15, 16 are provided on the rear part of the body 1. The left running means 15 has two forward and backward wheels 12a, 12b and the right running means 16 has two forward and backward wheels 13a, 13b. The wheels 12a, 12b are provided separately from each other in the front and rear direction of the vehicle on a triangular support frame 17 while the wheels 13a, 13b are provided separately from each other in the front and rear direction thereof on a triangular support frame 18. The support frame 17, 18 are pivotably connected, at their respective upper portions and at their respective intermediate positions in the front and rear direction of the vehicle, to the opposite sides of the body 1 through two pins 20, 21, respectively.

The support frame 7 has a hydraulic motor (oil motor) 23 on its back surface. The hydraulic motor 23 is formed integrally with the support frame 7. The motor 23 drives the two wheels 2a, 2b through a transmission winding link member 31 such as a chain. Likewise, other hydraulic motors 24, 25, 26 are provided on the support frames 8, 17, 18 to drive the wheels 3a, 3b; 12a, 12b; 13a, 13b through three transmission winding link members 32, 33, 34, respectively. The hydraulic motors 23, 25 located on the left side of the vehicle are driven by a single hydraulic pump 36 so that the wheels 2a, 2b; 12a, 12b are rotated at the same speed while the hydraulic motors 24, 26 located on the right side of the vehicle are driven by a single hydraulic pump 37 so that the wheels 3a, 3b; 13a, 13b are rotated at the same speed.

The pumps 236, 37 are operated by a single engine 39 at the same time. An amount of oil discharge of the pump 36 is adjusted by a handle 40 while an amount of oil discharge of the pump 37 is adjusted by a handle 41. The handle 40 is disposed on the right side (left side as viewed from a driver sitting on a seat) while the handle 41 is disposed on the left side (right side as viewed from the driver sitting on the seat) in FIG. 3 which shows a front view of the vehicle. That is, a driver can control rotational speed of the left side wheels 2a, 2b; 12a, 12b by the left side handle 40 while the driver can control rotational speed of the right side wheels 3a, 3b; 13a, 13b by the right side handle 41.

On the bottom of the body 1 is provided a hydraulic cylinder 45 which swings a rear body 43 as shown in FIG. 1 and which is connected to a pump 38 driven by the engine 39 in the same manner as the pumps 36, 37. The cylinder 45 is connected to the pump 38 via a changeover valve 47 which is operated by a change lever 48.

In the above uneven ground vehicle, the handles 40, 41 are operated to drive the motors 23 to 26 after the engine 39 is started whereby the four pairs of wheels 2a, 2b; 3a, 3b; 12a, 12b; 13a, 13b are rotated through the transmission winding link members 31, 32, 33, 34, respectively. When the vehicle is steered, oil discharge of the two pumps 36, 37 is changed by operation of the handles 40, 41 so that rotational speed of the left and right motors 23, 25; 24, 26 is changed thereby to make a difference in rotational speed between the left and right wheels 2a, 2b, 12a, 12b; 3a, 3b, 13a, 13b. That is, when the vehicle is turned to the left, rotational speed of the right wheels 3a, 3b; 13a, 13b is increased as compared with that of the left wheels 2a, 2b; 12a, 12b. In contrast, when the vehicle is turned to the right, rotational speed of the left wheels 2a, 2b; 12a, 12b is increased as compared with that of the right wheels 3a, 3b; 13a, 13b.

Figure 4:
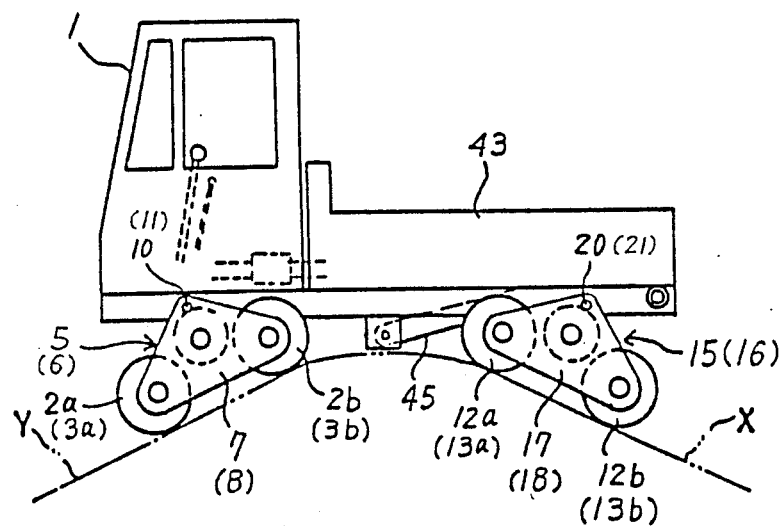
FIG. 4 is a side view of the vehicle, showing a state wherein the vehicle passes over a raised ground.

When the vehicle runs on a flat ground, the running means 5, 6, 15, 16 are maintained horizontally without swinging about their respective pins 10, 11, 20, 21 (centers of their swing motion) as shown in FIG. 1. However, when the vehicle runs on an uneven ground having a big raised surface, for example, when the vehicle moves from an upgrade surface X to a downgrade surface Y as shown in FIG. 4, the support frame 7, 8 of the front running means 5, 6 are swung rearward about the pins 10, 11. At this time, the foward wheels 2a, 3a are lowered while the backward wheels 2b, 3b are raised, respectively, thereby to avoid separation or floatation of each wheel from the running surface Y. Further, the support frames 17, 18 of the rear running means 15, 16 are swung forward about the pins 20, 21 so that the forward wheels 12a, 13a are raised while the backward wheels 12b, 13b are lowered, respectively, thereby to avoid separation of each wheel from the running surface X.

In this manner, in this vehicle, all wheels 2a, 2b; 3a, 3b; 12a, 12b; 13a, 13b can keep a contact with the surfaces X, Y even when the vehicle runs on the uneven ground. That is, the vehicle of this invention has no defect that the forward and backward end portions of endless belts in a conventional crawler drive vehile are separated or floated from the ground when the conventional crawler drive vehicle runs on the uneven ground. Accordingly, in this invention, a sufficient tractive force and a stable driving ability are obtainable even when the vehicle runs on an extremely uneven ground.

Figure 5:
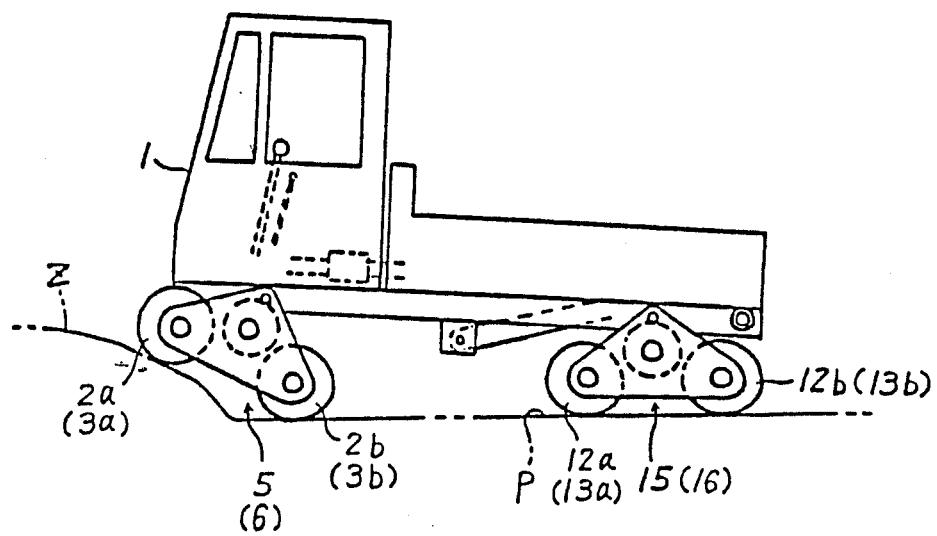
FIG. 5 is a side view of the vehicle, showing a state wherein the vehicle is coming to a raised ground.

In case that the front running means 5, 6 pass over a raised ground Z as shown in FIG. 5, there is a state wherein the forward wheels 2a, 3a are located on the raised ground Z while the backward wheels 2b, 3b are still located on a flat ground P. At this time, the backward wheels 2b, 3b contacting the flat ground P function to push the forward wheels 2a, 3a located on the raised ground Z. Also in case that the forward wheels 12a, 13a of the rear running means 15, 16 pass over the raised ground Z, the backward wheels 12b, 13b thereof function to push the forward wheels 12a, 13a. Further, when the forward wheels 2a, 3a, 12a, 13a are located on a flat ground while the backward wheels 2b, 3b, 12b, 13b pass over a small projection, the forward wheels 2a, 3a, 12a, 13a contacting the flat ground function to draw the backward wheels 2b, 3b, 12b, 13b so that the right side wheels can pass over the projection easily.

In this manner, the vehicle of this invention can pass over the raised uneven projection Z and the small projection on an uneven ground easier than a conventional crawler drive vehicle.

In addition, even if the forward wheels 2a, 3a are moved upward on the raised ground Z, the front part of the body 1 is not much raised immediately because of swinging motion of the front running means 5, 6 as shown in FIG. 5. That is, in this case, as the backward wheels 2b, 3b are located on the flat ground P, the height of the front part of the vehicle is increased only by half of the raised height of the forward wheels 2a, 3a from the flat ground P. When the backward wheels 2b, 3b are raised to the same height as that of the forward wheels 2a, 3a, the raised height or distance at the front part of the body 1 becomes equal to that of the forward and backward wheels 2a, 3a; 2b, 3b. However, the front part of the body 1 is raised gradually or slowly in comparison with a conventional crawler drive vehicle. Therefore, rapid inclination of the body 1 can be avoided to improve a riding quality.

Furthermore, as the number of the wheels is larger than that of a conventional four wheel car, tractive force of the vehicle is much increased and the vehicle can run smoothly on a flat ground without generating noise.

In addition, as the hydraulic motors 23, 24, 25, 26 are supported directly by the support frames 5, 6, 15, 16, respectively, so that they are swung integrally with the support frames, transmission of a driving force from an engine to the wheels can be carried out smoothly. In contrast, in a conventional vehicle, as a hydraulic motor is fixed directly to the body 1 and a driving force is transmitted mechanically from an engine to wheels through a differential gear, such transmission cannot be carried out smoothly because of a reaction force caused by the swinging motion of each support frame. The reaction force exerts an influence on the transmission of the driving force and is transmitted to a driving source via chains such as the link members 31 to 34 to cause troubles of a transmission mechanism.

In the first embodiment, a hydraulic driving means is used as a driving means for driving the wheels. However, a mechanical or an electric driving means may be used if they have a construction which can avoid such a reaction force caused by the swinging motion of each support frame.

Figure 6:
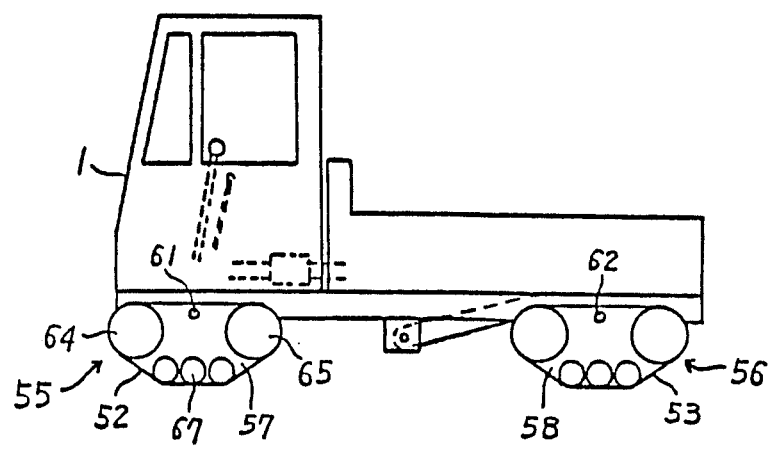
FIG. 6 is a side view of an uneven ground vehicle, showing a second embodiment of this invention.

FIG. 6 shows a second embodiment of this invention.

In this second embodiment, there are provided two front and rear running means 55, 56 which are different from those of the first embodiment. That is, the running means 55, 56 have two support frames 57, 58 around which two endless belts or crawlers run, respectively. The support frame 57 of the front running means 55 is swingably connected, through a pin 61, to the front part of the body 1 while the support frame 58 of the rear running means 56 is swingably connected, through a pin 62, to the rear part of the body 1. The lower side of the support frame 57 has a plurality of guide rollers 67. At the forward and backward ends of the support frame 57 are provided two sprockets 64, 65 which drive the endless belt 52 together with the guide rollers 67. The rear running means 56 has the same construction as that of the front running means 55.

In this second embodiment, pressure of ground contact per an unit area becomes smaller than that of the first embodiment. Accordingly, the vehicle of the second embodiment can run on a soft ground such as a wet ground or a snow-covered road while the endless belts 52, 53 swing freely in response to the shape of the ground. In this case, as the endless belts 52, 53 can always contact the ground during running without separation or floatation of a part of each endless belt from the ground, a sufficient tractive force and stable running are secured and inclination of the body 1 occurs slowly in the case of running on an uneven ground thereby to obtain a comfortable driving. Further, as a concentrated load is not partially exerted on each endless belt, breakage of the endless belt due to the concentrated load can be avoided and its endurance is remarkably increased. In addition, the vehicle of this second embodiment has four endless belts or crawlers. Even if one of the endless belts should break, the vehicle can run by using other endless belts. In a conventional vehicle, a single motor drives two left and right endless belts and, accordingly, a driving force transmission mechanism becomes complicated and bulky to increase its cost. However, according to the second embodiment, each of the four endless belts is driven by each of four motors, respectively, and, therefore, the driving force transmission mechanism becomes simple and the size of each endless belt or crawler is small to decrease their costs. Moreover, if one of the crawlers should break, only the broken crawler needs to be exchanged for a new one. That is, as each crawler is small and short, the broken crawler is cheap in comparison with a conventional long crawler or caterpillar whereby cost for maintenance can be remarkably decreased.

Figure 7:
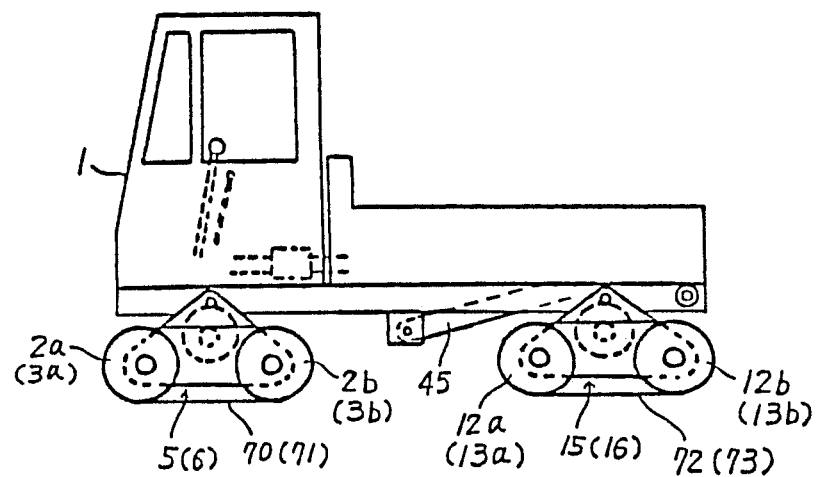
FIG. 7 is a side view of an uneven ground vehicle, showing a third embodiment of this invention.
Figure 8:
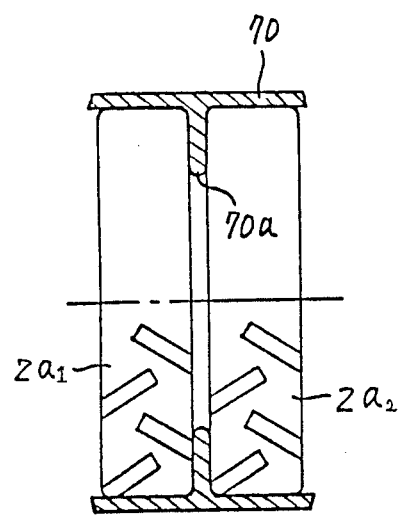
FIG. 8 is a cross-sectional view of an endless belt, showing a state of engagement between wheels and the endless belt.

FIG. 7 shows a third embodiment of this invention. In the first embodiment, all wheels contact directly the ground. However, in this third embodiment, four running means 5, 6, 15, 16 have four endless belts 70, 71, 72, 73 such as crawlers or the like, each of which runs around the two wheels or tires supported by each support frame. Each endless belt is installed around the wheels in such a manner that an inner projection 70a of the endless belt 70 is held between the two wheels 2a, 2a which are disposed coaxially with each other as shown in FIG. 8. That is, first of all, an inner wheel $2a_1$, disposed on the side of the body is installed on an axle and, thereafter, the inner side of the endless belt 70 is pushed onto the peripheral surface of the inner wheel $2a_1$ in the lateral direction. Finally, an outer wheel $2_2$ is pushed into the outer side of the endless belt 70 to hold the inner projection 70a between the inner and outer wheels $2a_1$, $2a_2$.

According to the third embodiment in which the crawlers or the like are installed directly around the wheels, pressure of ground contact per an unit area becomes small to enable the vehicle to run on a wet ground or a snow-covered ground. Further, the construction of the running means shown in FIG. 6 has a defect that a comfortable ride is not given because of inferior elasticity of the running means. In contrast, according to the third embodiment, a comfortable ride is secured because of enough elasticity of each wheel or tire. In addition, even if each endless belt should be broken, the vehicle can continue to run because a driving force from each hydraulic motor is transmitted to each wheel via each chain.

Engagement of the wheels and an endless belt may be made in the following manner.

That is, in general, the peripheral surface of a wheel has a plurality of recesses. Therefore, a plurality of projections may be formed on the inner surface of each endless belt so as to be engaged with the recesses of the outer peripheral surface of each wheel. In this construction, the projections formed on the outer surface of each wheel function as a sprocket to move each endless belt. In this case, it is not necessary that the two inner and outer wheels are disposed coaxially as shown in FIG. 8. Especially, in this embodiment, the two forward and backward wheels on one running means are rotated synchronously by one hydraulic motor. Therefore, each endless belt can be rotated easily and reliably. When each endless belt is installed around the wheels or tires, the projections of the endless belt may be engaged with the recesses of each wheel in a state wherein air is discharged from the wheels and, thereafter, air is supplied into the wheels.

Figure 9:
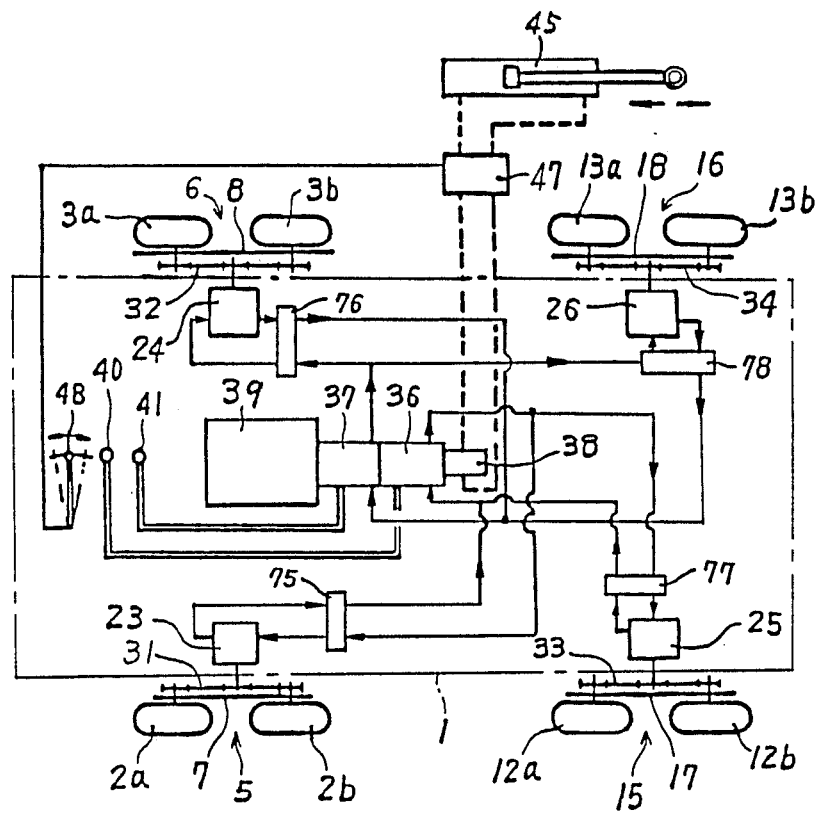
FIG. 9 is a plan view of a driving system of an uneven ground vehicle, showing a fourth embodiment of this invention.

FIG. 9 shows a fourth embodiment.

Figure 10:
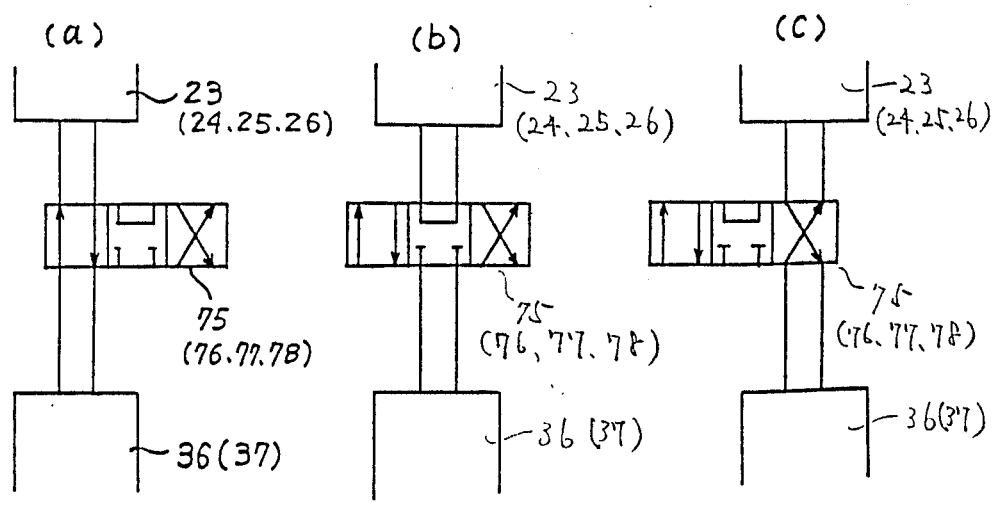
FIG. 10 (a) (b) and (c) are views showing three states wherein a direction change-over valve of the driving system takes three different positions, respectively.

In this fourth embodiment, there are provided four direction change-over valves 75, 76, 77 and 78 which are located between the pump 36 and the hydraulic motor 23, between the pump 37 and the hydraulic motor 24, between the pump 36 and the hydraulic motor 25 and between the pump 37 and the hydraulic motor 26, respectively. Each direction change-over valve has a construction, as shown in FIG. 10, in which three positions 10(a), 10(b), 10(c) can be taken. When each valve takes a first position shown in FIG. 10(a), the vehicle runs forward. When each valve takes a third position shown in FIG. 10(c), the vehicle runs backward. In these two cases, a driving force is transmitted to all wheels and this running mode is similar to full-time running mode in a four wheel drive car.

When the direction change-over valves 75,76 disposed on the front side of the vehicle take the first position shown in FIG. 10(a), respectively, in a state wherein the direction change-over valves 77,78 disposed on the rear side of the vehicle take a second position shown in FIG. 10(b), respectively, all pressure oil discharged from the pumps 36,37 are supplied to the hydraulic motors 23, 24 disposed on the front side of the vehicle, respectively. In this case, as any oil is not supplied to the hydraulic motors 25,26 disposed on the rear side thereof, an amount of oil supplied to the motors 23,24 becomes two times of the full-time running mode to increase rotational speed of the hydraulic motors 23, 24 two times. As a result, running speed of the vehicle becomes double. At this time, oil in the hydraulic motors 25,26 is simply circulated therein and the motors 25,26 do not generate a driving force for the rear side wheels 12a, 12b; 13a, 13b, respectively. Instead, the front motors 23,24 generate a driving force for the front wheels 2a, 2b; 3a, 3b, respectively, and this running mode is similar to part-time running mode. In this part-time running mode, the vehicle can run on an aneven ground while changing the rotational number of the motors 23,24 by adjusting an amount of oil discharged from the pumps 36,37. Accordingly, the vehicle can be steered by only the two front running means 5,6 thereby to increase its steerability. Further, in this part-time running mode, as running speed of the vehicle can be increased two times of the full-time running mode as mentioned above, the part-time mode is suitable for running on a flat ground such as a flat road where the vehicle is moved fast.

Figure 11:
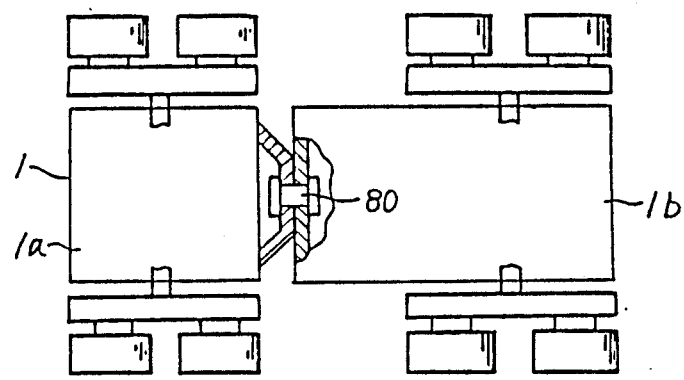
FIG. 11 is a structural plan view of an uneven ground vehicle, showing a fifth embodiment of this invention.

FIG. 11 shows a fifth embodiment in which the body 1 comprises a front part 1a and a rear part 1b separated from each other. The two parts 1a, 1b are connected with each other through a joint pin 80 extending in the front and rear direction of the vehilce, which enable the two parts 1a, 1b to swing about the joint pin 80 independently of each other (rolling motion).

According to the fifth embodiment, even in the case that one of the four running means happens to ride on the raised ground Z as shown in FIG. 5, either part of the body 1 can swing freely. Therefore, all wheels can always contact the ground thereby to enable the vehicle to run on an extremely uneven ground with an efficient tractive force and stable running.

Figure 12:
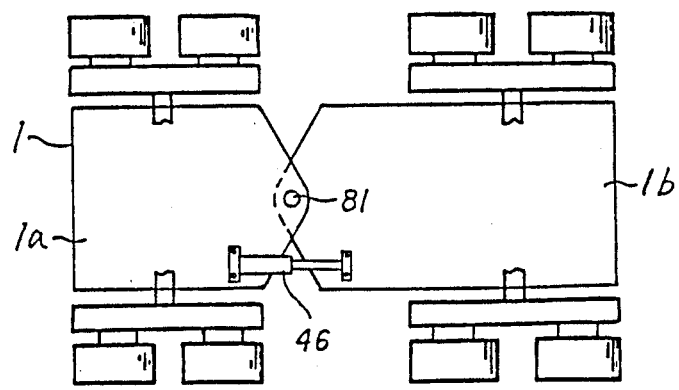
FIG. 12 is a structural plan view of an uneven ground vehicle, showing a sixth embodiment of this invention.

FIG. 12 shows a sixth embodiment in which the body 1 is divided into two front and rear parts 1a, 1b which are connected with each other through a vertical joint pin 81. Accordingly, the two parts 1a, 1b can swing horizontally about the vertical joint pin 81. Between the two parts is provided a hydraulic cylinder 46 for swinging the two parts about the pin 81 whereby the vehicle can be steered freely. This steering mechanism can decrease its tactical diameter as compared with the tactical diameter in the case that the vehicle is steered by changing rotational speed of left and right wheels thereby to increase its steerability.

Figure 13:
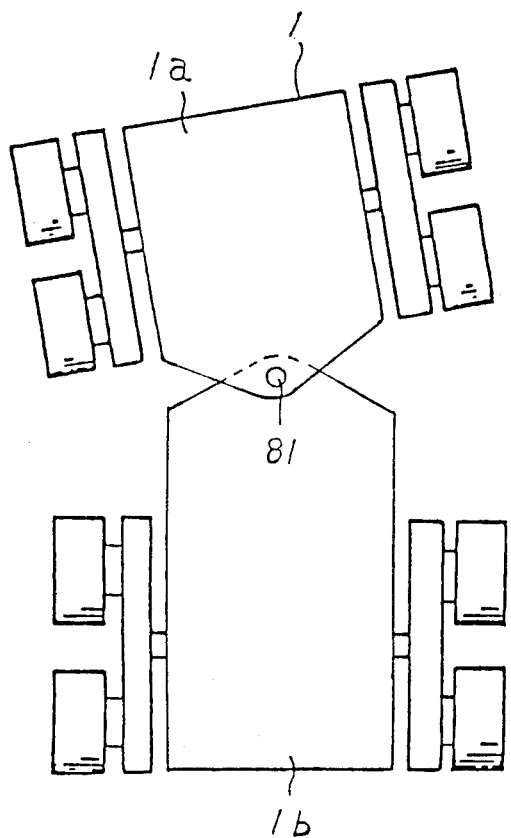
FIG. 13 is a plan view of the vehicle shown in FIG. 12, showing a state of steering of the vehicle.

The cylinder 46 is not necessarily provided, and the steering mechanism in the first embodiment may be adopted as shown in FIG. 13.

In this case, as the body 1 is divided into the two parts via the vertical pin 81, the front part 1a can be easily swung when rotational speed of left and right wheels is changed.

Figure 14:
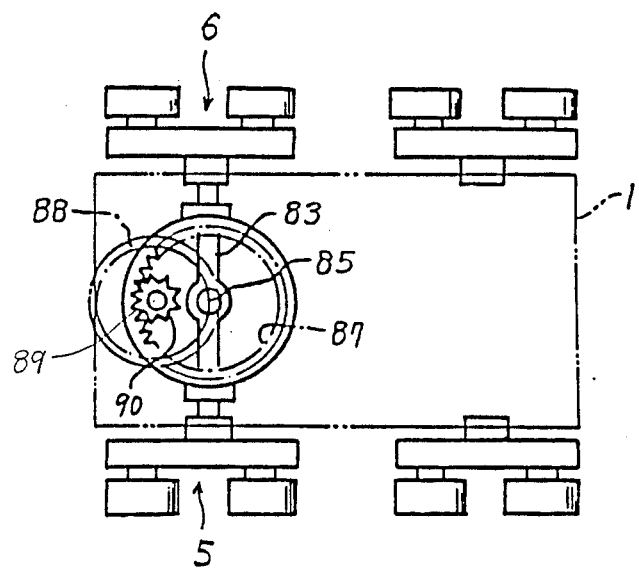
FIG. 14 is a plan view of an uneven ground vehicle, showing a seventh embodiment of this invention.

FIG. 14 shows a seventh embodiment in which the front left and right running means 5, 6 are connected with each other through an axle 83. The axle 83 is connected, swingably in a horizontal plane, to the body 1 through a vertical pin 85. The axle 83 has an inner gear 87 which is concentric with the pin 85. A pinion 90 is engaged with the inner gear 87 and fixed to the lower end of a steering shaft 89, at the upper end of which a steering wheel 88 is held. Accordingly, when the steering wheel 88 is rotated, the axle 83 swings around the vertical pin 85 thereby to swing the left and right running means 5, 6 whereby tactical diameter of the vehicle is decreased to increase its steerability.

Figure 15:
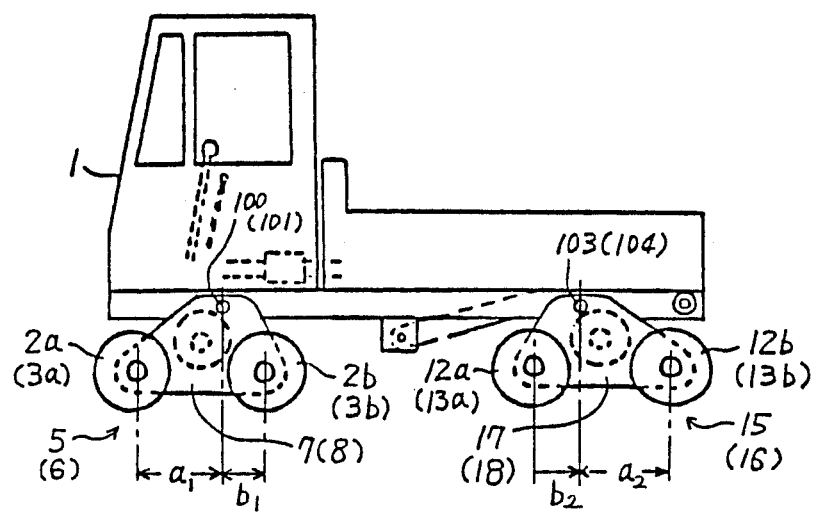
FIG. 15 is a side view of an uneven ground vehicle, showing an eighth embodiment of this invention.

FIG. 15 shows an eighth embodiment.

Figure 16:
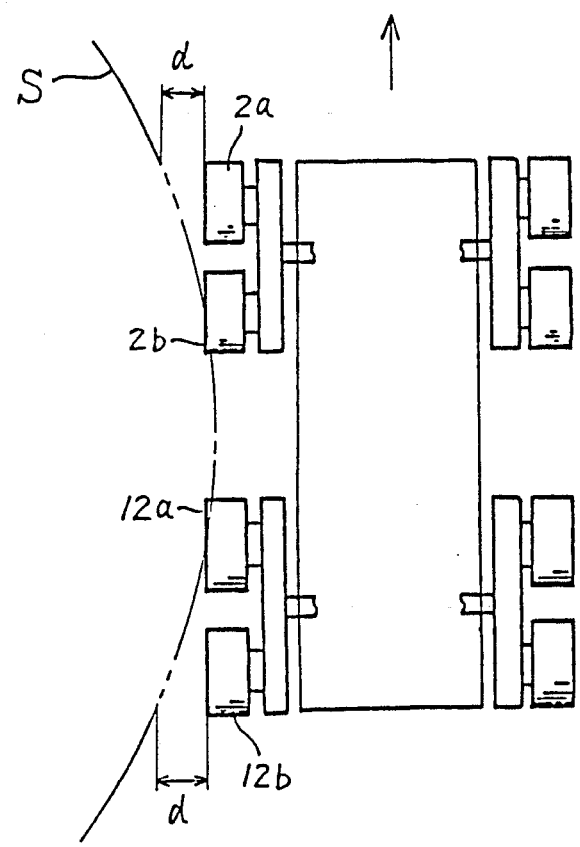
FIG. 16 is a plan view of the vehicle, showing a state wherein the vehicle is turned along a turning locus.

In this embodiment, the support frames 7, 8 of the front and right running means 5, 6 are pivotably connected to the body 1 through two support pins 100, 101, respectively, while the support frames 17, 18 of the rear left and right running means 15, 16 are pivotably connected to the body 1 through two support pins 103, 104, respectively. The front support pins 100, 101 are located in positions deviated backward from the center of each support frame in the front and rear direction of the vehicle, respectively. In contrast, the rear support pins 103, 104 are located in positions deviated forward from the center of each support frame in the front and rear direction of the vehicle, respectively. For example, the ratio of the horizontal distance $a_1$ between the center of the forward wheel 2a or 3a and the support pin 100 or 101 and the horizontal distance $b_1$ between the center of the backward wheel 2b or 3b and the support pin 100 or 101 is determined as 2:1. The ratio of the horizontal distance $a_2$ between the center of the backward wheel 12b or 13b and the support pin 103 or 104 and the horizontal distance $b_2$ between the center of the forward wheel 12a or 13a and the support pin 103 or 104 is also determined as 2:1. In this case, load exerted on the backward wheel 2b or 3b and the forward wheels 12a or 13a is twice as large as load exerted on the forward wheel 2a or 3a and the backward wheels 12b or 13b. This construction can increase steerability of the vehicle. That is, when the vehicle is turned to the left while rotational number of the right wheels is increased as compared with that of the left wheels as shown in FIG. 16, the two wheels 2b, 12a located in the intermediate positions of the vehicle move along a curved line (turning locus) S and, however, the two wheels 2a, 12b located at the outer ends of the vehicle move slipping at positions deviated by a distance d from the line S thereby to cause a frictional resistance which exerts an influence on steerability of the vehicle. In this embodiment, load exerted on the outer wheels 2a, 12b is smaller than that exerted on the inner wheels 2b, 12a thereby to decrease the frictional resistance of the outer wheels 2a, 12b. Accordingly, steerability of the vehicle can be increased remarkably. Further, when the forward wheel 2a or 3a rides on the raised ground Z of FIG. 5, shock or impact exerted on the forward wheel 2a or 3a becomes small to increase a driving quality because load exerted on the forward wheel 2a or 3a is smaller than that of the backward wheel 2b or 3b.

Figure 17:
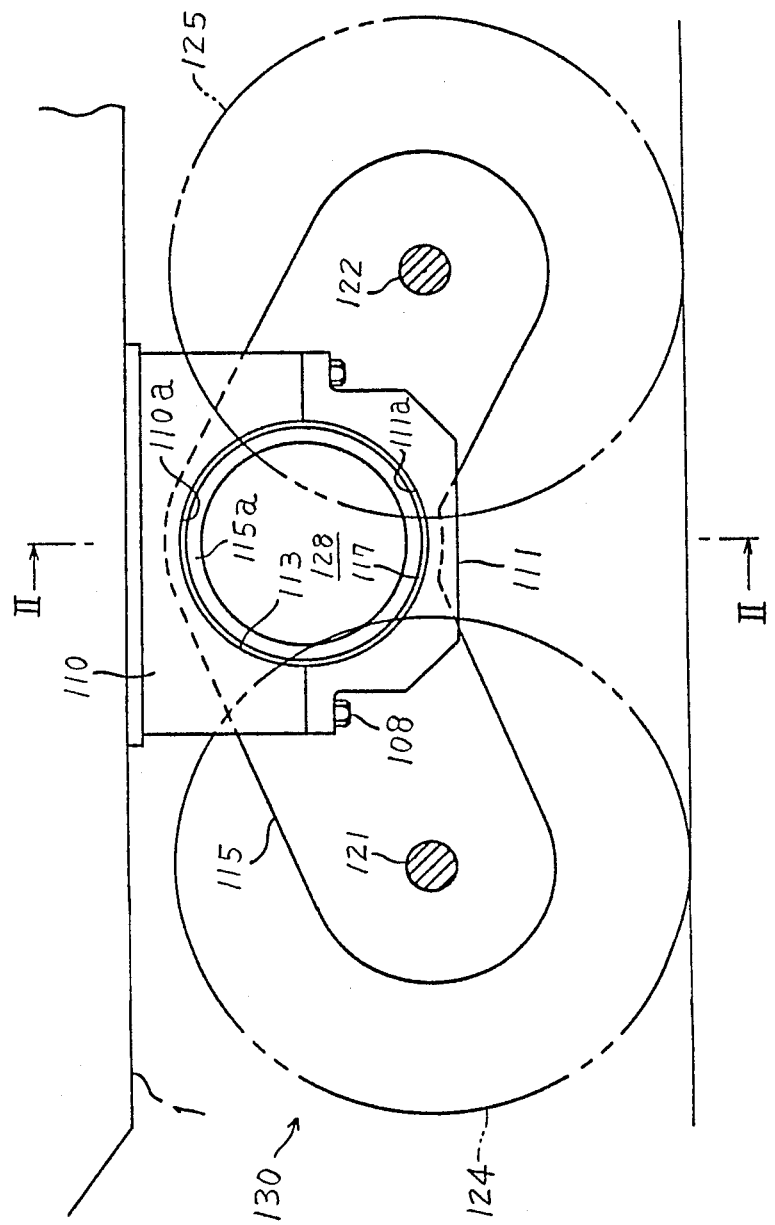
FIG. 17 is a side view of a wheel support mechanism, showing a ninth embodiment of this invention.
Figure 18:
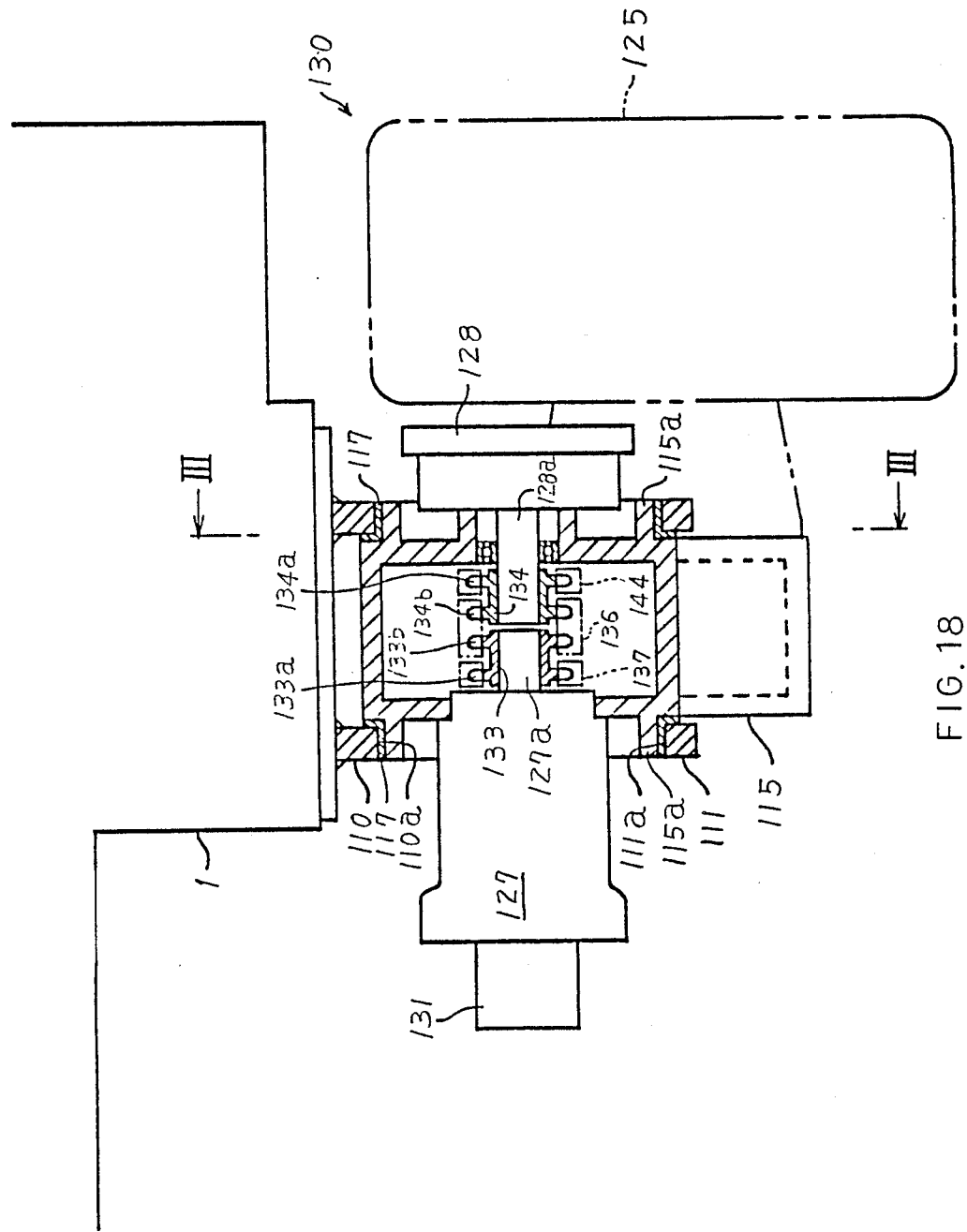
FIG. 18 is a cross-sectional view taken along the line II—II in FIG. 17.
Figure 19:
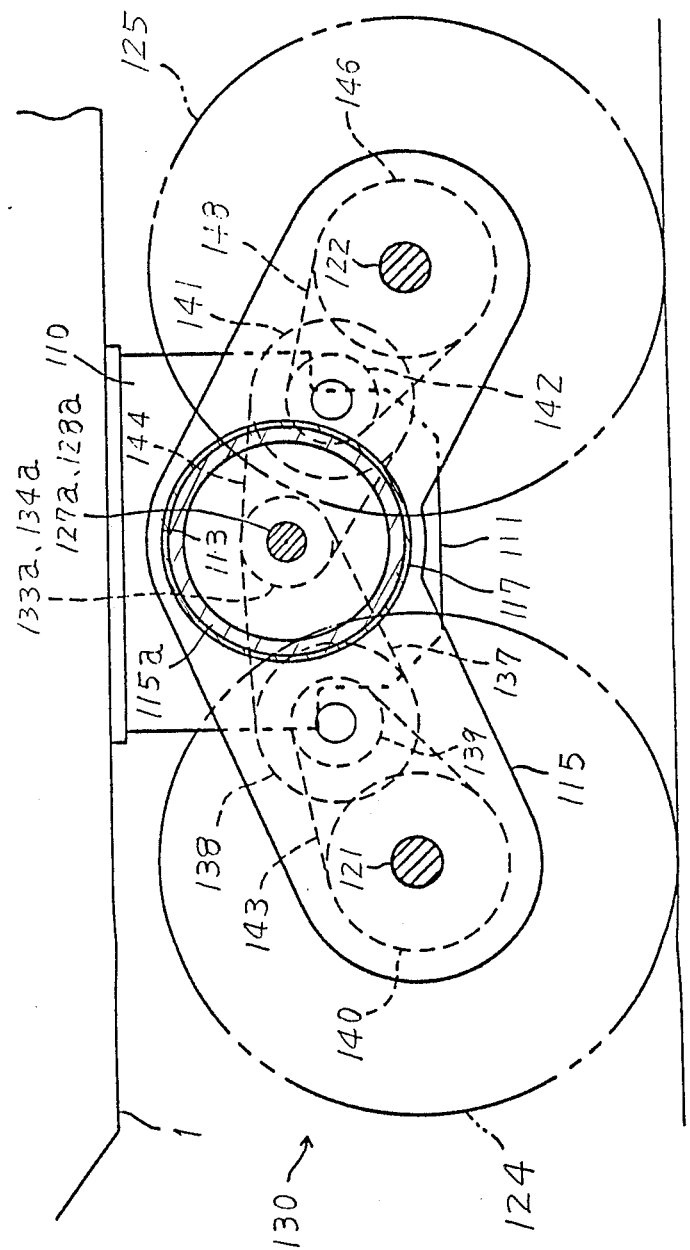
FIG. 19 is a cross-sectional view taken along the line III—III in FIG. 18.

FIGS. 17 to 19 show a ninth embodiment of this invention in which the center of the driving shaft of each hydraulic motor for driving the wheels coincides with that of swinging motion of each support frame. That is, in FIG. 17, the body 1 has an upper bracket 110 at its bottom surface and the upper bracket 110 has a semi-circular recess 110a. To the upper bracket 110 is fixed a lower bracket 111 having a semi-circular recess 111a via a plurality of bolts 108. On the bottom of the body 1 are provided two bracket units each comprising the upper and lower brackets 110, 111 at a space interval in the lateral direction of the vehicle as shown in FIG. 18.

A support frame 115 in the shape of a boomerang, as shown in FIG. 17, is held between the two bracket units and has a rectangular hollow shape in cross section as shown in FIG. 18. The support frame 115 has, on its outer and inner faces, two annular projections 115a, 115a for being engaged with two circular holes 113 formed in the two bracket units, respectively. Each circular hole 113 has a bearing 117 made of gun metal and the support frame 115 is held swingably through the annular projections 115a, the bearing 117 and the two bracket units. Two wheels 124, 125 are supported rotatably on the both ends of the support frame 115 through two axles 121, 122, respectively, and the support frame 115 and the wheels 124, 125 form a running means 130.

In FIG. 18, on the inner face of the support frame 115 is supported a hydraulic motor 127 whose driving shaft 127a extends into the inside of the support frame 115. A drum brake 128 is supported on the outer end face of the support frame 115 and a brake shaft 128a extends from the brake drum 128 into the inside of the support frame 115 so that the inner end of the brake shaft 128a is opposed to the outer end of the driving shaft 127a in the support frame 115.

The driving shaft 127a has a sprocket wheel 133 at its peripheral surface, which comprises a pair of sprockets 133a, 133b while the brake shaft 128a has a sprocket wheel 134 at its peripheral surface, which comprises a pair of sprockets 134a, 134b. The two sprockets 133b, 134b are connected with each other through a chain coupling member 136 so that the brake shaft 128a is rotated integrally with the driving shaft 127a. Therefore, even if the driving shaft 127a and the brake shaft 128a are assembled in their slightly deviated positions due to an error during their assembly, the chain coupling member 136 functions to ease or absorb its small deviation thereby to transmit smoothly a driving force to the wheels.

A chain 137 is mated with the sprocket 133a and runs between the sprocket 133a and a sprocket 138 whose diameter is larger than that of the sprocket 133a. A sprocket 139 whose diameter is smaller than that of the sprocket 138 is provided coaxially with the sprocket 138 and a chain 143 runs between a sprocket 139 and a sprocket 140 fixed to the axle 121, the diameter of which is larger than that of the sprocket 139. The sprocket 134a is engaged with a chain 144 as shown in FIG. 18. The chain 144 is engaged with the sprocket 141 provided rotatably in the support frame 115, the diameter of which is larger than that of the sprocket 134a. A sprocket 142 whose diameter is smaller than that of the sprocket 141 is provided coaxially with the sprocket 141 and a chain 148 runs between the sprocket 142 and a sprocket 146 fixed to the axle 122, the diameter of which is larger than that of the sprocket 142.

In this driving force transmitting mechanism, pressure oil is supplied to the hydraulic motor 127 via the valve 131 to rotate the driving shaft 127a which drives the brake shaft 128a through the sprocket 133b, 134b and the chain coupling member 136. Rotation of the sprocket 133a is transmitted to the sprocket 138 through the chain 137 with a decreased rotational speed of the sprocket 138. Rotation of the sprocket 138 is transmitted to the sprocket 140, that is, the axle 121 through the sprocket 139 and the chain 143 with a decreased rotational speed of the sprocket 140. In this manner, the wheel 124 is rotated.

Further, rotation of the sprocket 134a is transmitted to the sprocket 141 through the chain 144 with a decreased rotational speed of the sprocket 141. Rotation of the sprocket 141 is transmitted to the sprocket 146, that is, the axle 122 through the sprocket 142 and a chain 148 with a decreased rotational speed of the sprocket 146. In this manner, the wheel 125 is rotated.

When the vehicle runs on an extremely uneven ground, the support frame 115 swings through the annular projections 115a and the bearing 117 thereby to ensure contact of the wheels with the ground at all times. Therefore, it is avoidable that a driving force and a tractive force is decreased due to separation or floatation of the wheels. When the vehicle is stopped running, first, the hydraulic motor 127 is stopped rotating and then the drum brake 128 is operated to stop gradually rotation of the brake shaft 128a. Therefore, the driving shaft 127a stops its rotation via the chain coupling member 136 whereby the axles 121, 122, that is, the wheels 124, 125 are stopped rotating through the chains 137, 143, 144, 148 and the sprockets 138, 139, 140, 141, 142, 146.

According to the swingable support mechanism of the running means, the hydraulic motor 127 can be disposed in a high position where the center of the driving shaft 127 coincides with the center axes of the annular projections 115a and, therefore, collision of the hydraulic motor 127 against a projected or raised ground can be reliably avioided. In contrast, in the first embodiment, the hydraulic motors 23 to 26 must be disposed in their respective positions lower than the support pins 10, 11, 20, 21. Accordingly, each hydraulic motor in the first embodiment cannot be disposed in a high position. Further, the support frame 115 of the running means 130 is supported swingably on the body 1 through the annular projections 115a each having a diameter large enough to accomomdate a part of the hydraulic motor 127 therein. Therefore, the annular projections 115a can endure a large tortional moment exerted thereon during turning of the vehicle. In addition, the annular projections 115a are disposed concentrically with the driving shaft 127a of the hydraulic motor 127 and, therefore, a necessary space for accommodating the driving shaft 127a and the projections 115a can be decreased thereby to make the body compact and simple.

In the ninth embodiment, the hydraulic motors are used as driving means and, however, electric motors or combustion engines and the like can be used instead of the hydraulic motors. Further, instead of the wheels 124, 125, a crawler or an endless belt may be used. Needle bearings, roller bearings or the like can be substituted for the gun metal bearings 117. Further, disc brakes or the like can be substituted for the drum brake 128. Rubber coupling members, Oldham's coupling members or the like which are suitable for easing or absorbing a small deviation of the axes of the driving shaft 127a and the brake shafts 128a can be also substituted for the chain coupling members 136. Moreover, timing pulleys or the like can be substituted for the chains disposed in a driving force transmitting mechanism of the running means.

Figure 20:
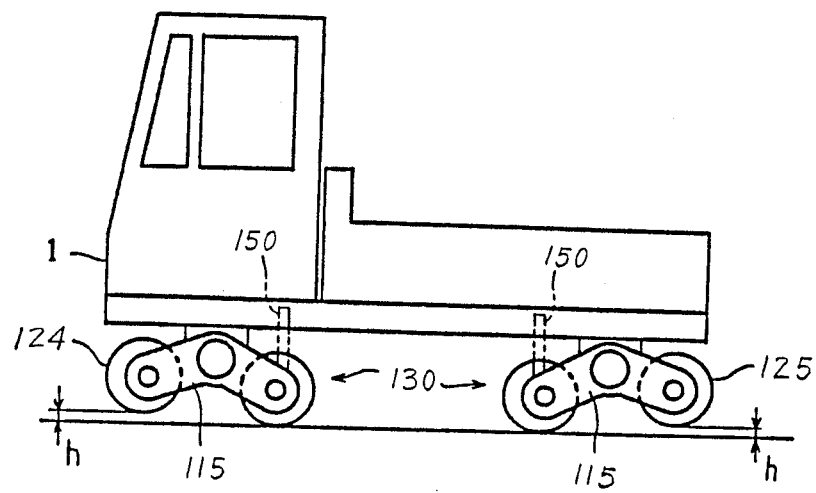
FIG. 20 is a side view of an uneven ground vehicle, showing a tenth embodiment of this invention.
Figure 21:
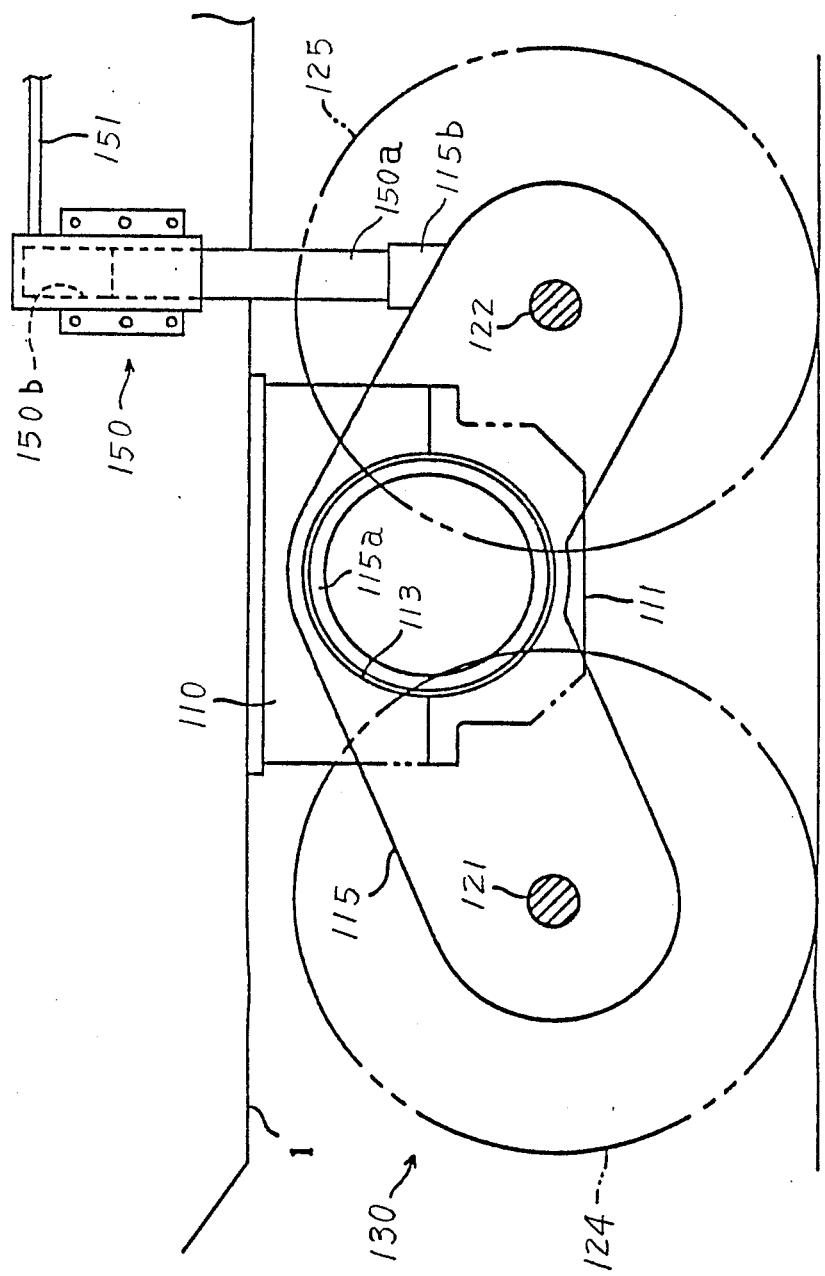
FIG. 21 is an enlarged side view of a wheel support mechanism shown in FIG. 20.
Figure 22:
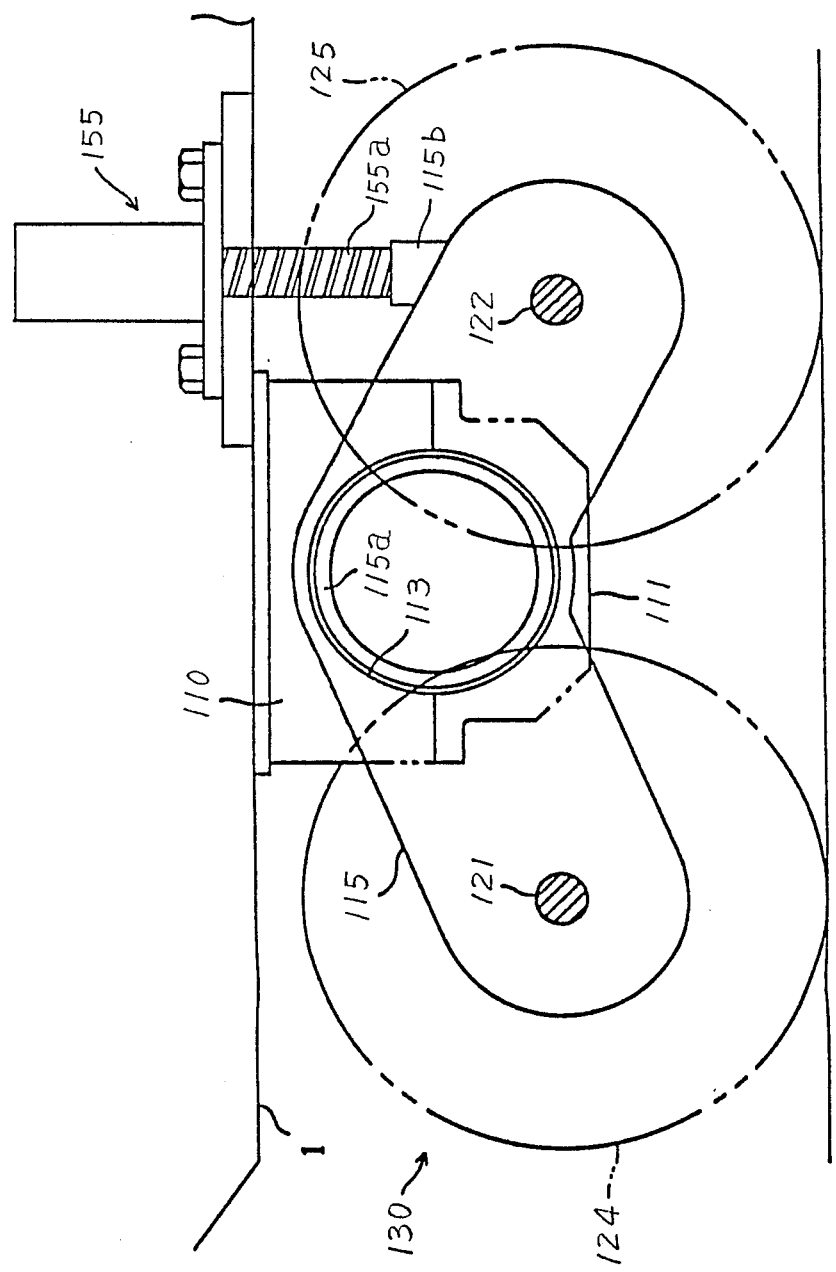
FIG. 22 is a side view of a wheel support mechanism, showing an eleventh embodiment of this invention.

FIGS. 20 to 22 show a tenth embodiment of this invention in which a support frame swinging means for swinging each support frame is provided between the body and the support frame. In FIG. 20, the body 1 has four front and rear running means 130. The body 1 has four hydraulic cylinders 150 each corresponding to a support frame and each hydraulic cylinder 150 forms a support frame swinging means. Each cylinder has a piston rod 150a whose lower end abuts against a receiving member 115b fixed to the support frame 115 and pressure oil is supplied into the main body 150b through a pipe 151 to move the piston rod 150a downward.

The hydraulic cylinder 150 is operated in the following manner.

When the vehicle is turned to the left or right, high pressure oil is supplied into the main body 150b of the hydraulic cylinder 150 through the pipe 151 to lower the piston rod 150a. Therefore, the inner arm of each support frame 115 is lowered so as to swing each support frame 115 whereby the forward wheel 124 of the front running means and the backward wheel 125 of the rear running means are raised upward by a distance h. Each support frame 115 is maintained in an inclined position during turning of the vehicle. With this state, if the vehicle is turned, only the intermediate wheels 2b, 12a run contacting the ground along such the turning locus S shown in FIG. 16 in a state wherein the outer wheels 2a, 12b are floated from the ground. Accordingly, a frictional resistance of the outer wheels 2a, 12b can be eliminated to facilitate its turning. Further, it is not always necessary that the outer wheels 2a, 12b are floated or separated completely from the ground if each support frame 115 is swung slightly so that pressure of ground contact of the outer wheels 2a, 12b is decreased.

FIG. 22 shows an eleventh embodiment of this invention.

In this embodiment, instead of the hydraulic cylinder 150 of FIG. 20, a ball screw jack 155 is used as a support frame swinging means. The jack 155 has a screw rod 155a whose lower end abuts against the receiving member 115b. According to the ball screw jack 155, a projected distance of the screw rod 155a can be adjusted precisely, that is, the angle of swing motion of each support frame 115 can be adjusted precisely.

Figure 23:
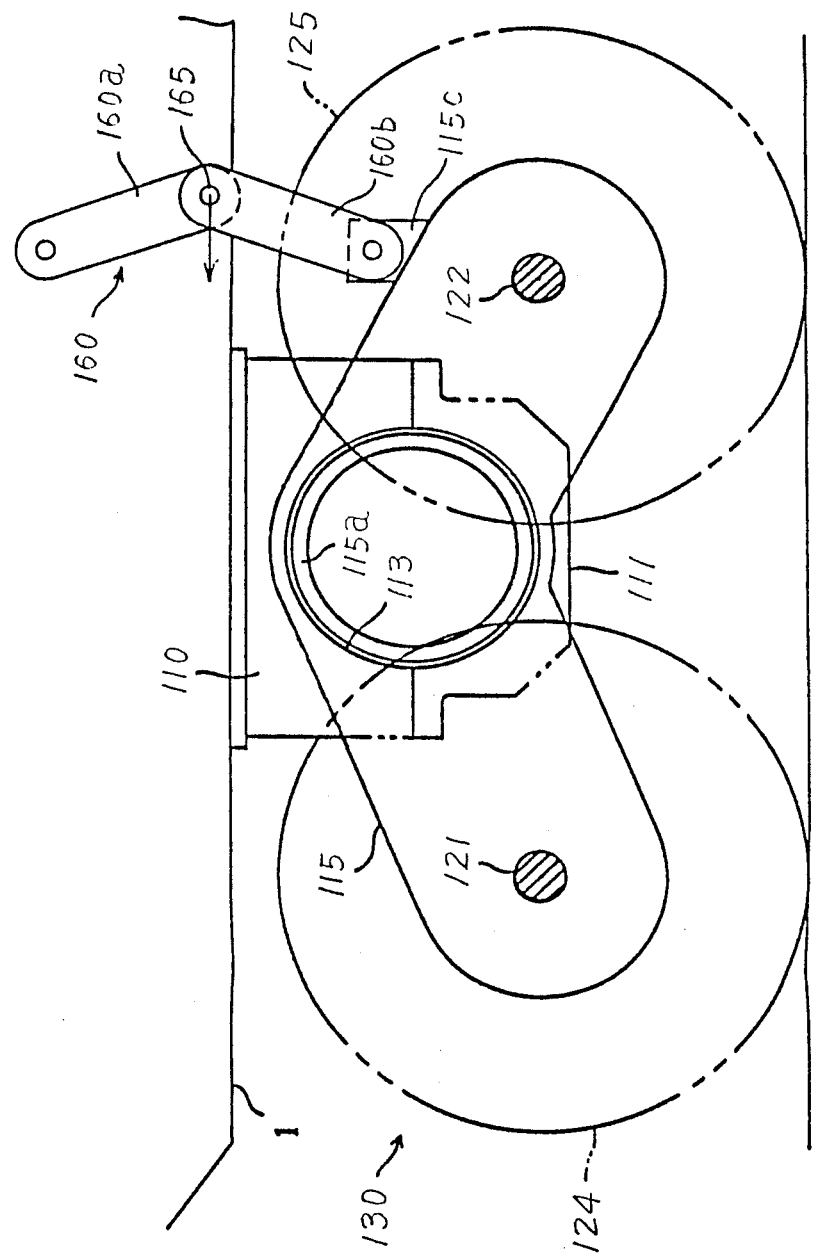
FIG. 23 is a side view of another wheel support mechanism, showing a twelfth embodiment of this invention.

FIG. 23 shows a twelfth embodiment of this invention in which a toggle link mechanism 160 is used as a support frame swinging means. The toggle link mechanism 160 has an upper link 160a whose upper end is rotatably supported by the body 1 and a lower link 160b whose lower end is rotatably connected to a projection 115c formed on the support frame 115. The upper and lower links 160a, 160b are connected with each other through a pin 165. The toggle link mechanism 160 is operated by pressure oil, pressure air or a motor through a driving means (not shown) such as a wire, rod or cam. When the vehicle is turned, the toggle link mechanism 160 is operated so that the upper and lower links 160a, 160b are aligned vertically and the upper and lower links 160a, 160b are maintained in the aligned position during turning of the vehicle.

This embodiment has the following advantageous effects as compared with other embodiments.

Figure 24:
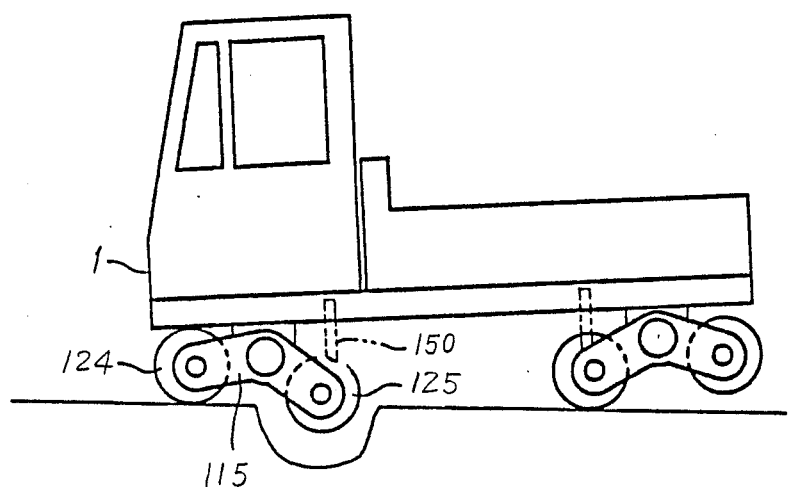
FIG. 24 is a side view of an uneven ground vehicle, showing a state wherein a front running means is dropped into a big groove.

In the tenth and eleventh embodiments, the hydraulic cylinder 150 and the ball screw jack 155 are adopted as support frame swinging means, respectively. In these embodiments, the lower ends of the piston rod 150a and screw rod 155a simply abut against the receiving members 115b, respectively. Therefore, when the backward wheel 125 on the side of the hydraulic cylinder 150 is dropped into a big groove or hole in a state wherein the forward wheel 124 is located on the ground, the support frame 115 is swung much in the clockwise direction as viewed in FIG. 24 in such a manner that the rear end of the piston rod is separated from the receiving member. At this time, the front part of the body 1 is lowered suddenly to give an uncomfortable feeling to a driver.

However, according to the toggle link mechanism 160, the lower end of the toggle link is connected to the projection 115c. Therefore, even in such a case where the backward wheel 125 is dropped in the big groove or hole, the front part of the body 1 is not lowered suddenly to give a good ride.

In the above embodiments as shown in FIGS. 11 to 24, each running means has a plurality of wheels supported by each support frame. However, a running means having an endless belt which runs around each support frame may be used.

What is claimed is:

1. An uneven ground vehicle suitable for running on an uneven ground, which comprises:
   (a) a body;
   (b) a plurality of running means each having a support frame for supporting wheels, tires or and/or a crawler, the running means being provided on two front and rear portions of the body in such a manner that a support frame of each running means is swingable; and
   (c) a plurality of driving means each provided on each running means, each driving means being fixed integrally to each support frame at the center axis of the swing motion thereof so that the support frame and the driving means can be swung integrally with each other.

2. An uneven ground vehicle according to claim 1, wherein the opposite ends of each support frame are located in their respective positions lower than the center portion of each support frame, the opposite ends thereof having two wheels, respectively, with its center portion swingably supported by the body.

3. An uneven ground vehicle according to claim 2, wherein each support frame is in the form of a boomerang, the support frame having, on its outer and inner faces, two annular projections for being swingably engaged with the body in a state wherein each driving means is provided inside of its radial direction.

4. An uneven ground vehicle according to claim 1, wherein each driving means comprises a hydraulic motor which is fixed to one side face of the support frame and which has a driving shaft extending into the inside of the support frame, a drum brake being fixed to the other side of the support frame, the drum brake having a brake shaft which extends into the inside of the support frame so that the inner end of the brake shaft is opposed to the inner end of the driving shaft, the brake and driving shafts being connected with each other so as to be rotated integrally.

5. An uneven ground vehicle according to claim 1, further comprising a support frame swinging means provided, on the center side in the longitudinal direction of the body, between each support frame and the body in order to swing the support frame and maintain it in a predetermined inclined position.

6. An uneven ground vehicle according to claim 5, wherein each support frame swinging means comprises a hydraulic cylinder whose piston abuts, at its lower end, against a receiving member fixed to the support frame.

7. An uneven ground vehicle according to claim 5, wherein each support frame comprises a ball screw jack.

8. An uneven ground vehicle according to claim 5, wherein each support frame comprises a toggle link mechanism.

* * * * *